United States Patent [19]
Nakagaki et al.

[11] Patent Number: 5,636,826
[45] Date of Patent: Jun. 10, 1997

[54] VIBRATION CONTROL DEVICE

[75] Inventors: Osamu Nakagaki; Tatsuo Suzuki; Koushi Ando, all of Aich Pref., Japan

[73] Assignee: Toyoda Gosei Co., Ltd., Nishikasugai-gun, Japan

[21] Appl. No.: 402,479

[22] Filed: Mar. 10, 1995

[30] Foreign Application Priority Data

| Mar. 10, 1994 | [JP] | Japan | ................. | 6-068058 |
| Sep. 30, 1994 | [JP] | Japan | ................. | 6-261527 |

[51] Int. Cl.$^6$ .............................. F16M 13/00
[52] U.S. Cl. ................. 248/562; 248/224.51; 248/634; 248/635; 248/638; 267/140.11; 267/140.13; 267/141
[58] Field of Search ............ 248/224.51, 224.61, 248/562, 634, 635, 638; 403/279, 281, 375, 381; 267/140.11, 140.13, 141

[56] References Cited

U.S. PATENT DOCUMENTS

| 4,159,091 | 6/1979 | Le Salver et al. | 248/634 X |
| 4,215,842 | 8/1980 | Brenner et al. | 248/634 X |
| 4,432,537 | 2/1984 | Pletsch | 248/634 X |
| 4,660,813 | 4/1987 | Reuter | 248/634 X |
| 5,018,699 | 5/1991 | Bretaudeau et al. | |
| 5,178,374 | 1/1993 | Maeno | |
| 5,240,233 | 8/1993 | Kato et al. | 248/562 X |
| 5,295,671 | 3/1994 | Nakagaki et al. | 248/562 X |
| 5,370,375 | 12/1994 | Kojima | 248/562 X |
| 5,433,421 | 7/1995 | Ishiyama | 248/562 X |

FOREIGN PATENT DOCUMENTS 5-44770  2/1993  Japan.

*Primary Examiner*—Alvin C. Chin-Shue
*Assistant Examiner*—Richard M. Smith
*Attorney, Agent, or Firm*—Cushman Darby & Cushman IP Group of Pillsbury Madison & Sutro LLP

[57] ABSTRACT

A vibration control device including a bracket, and a vibration control body. The bracket has a stay portion for connection to an engine, a flange portion formed at one end of the stay portion, and a stabilizer portion to damp large magnitude movements of the body. The vibration control body includes an insulator made of anti-vibration rubber or other resilient material, an upper plate, and a stopper portion. The flange portion preferably slidably receives the upper plate in order to couple the bracket and vibration control body together.

10 Claims, 4 Drawing Sheets

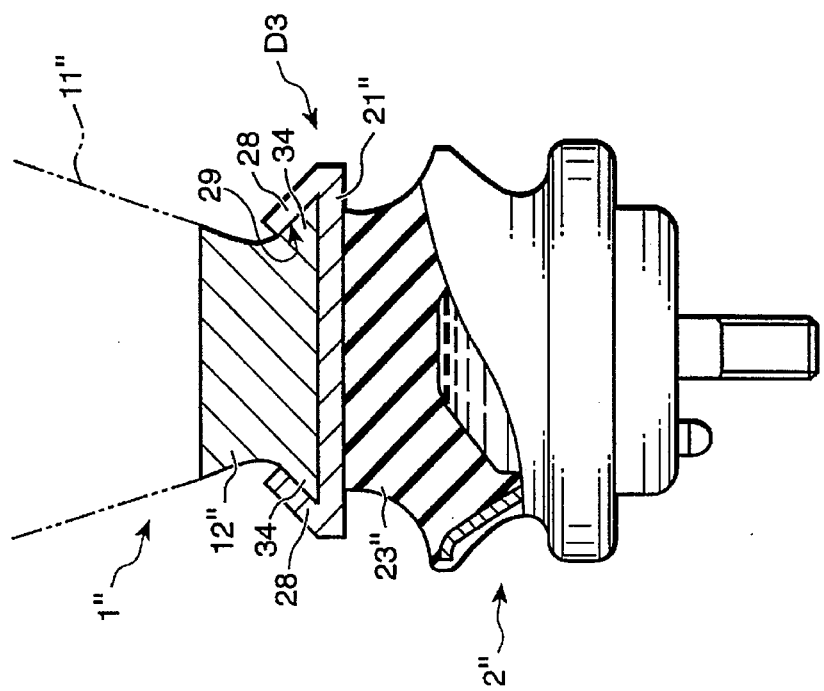
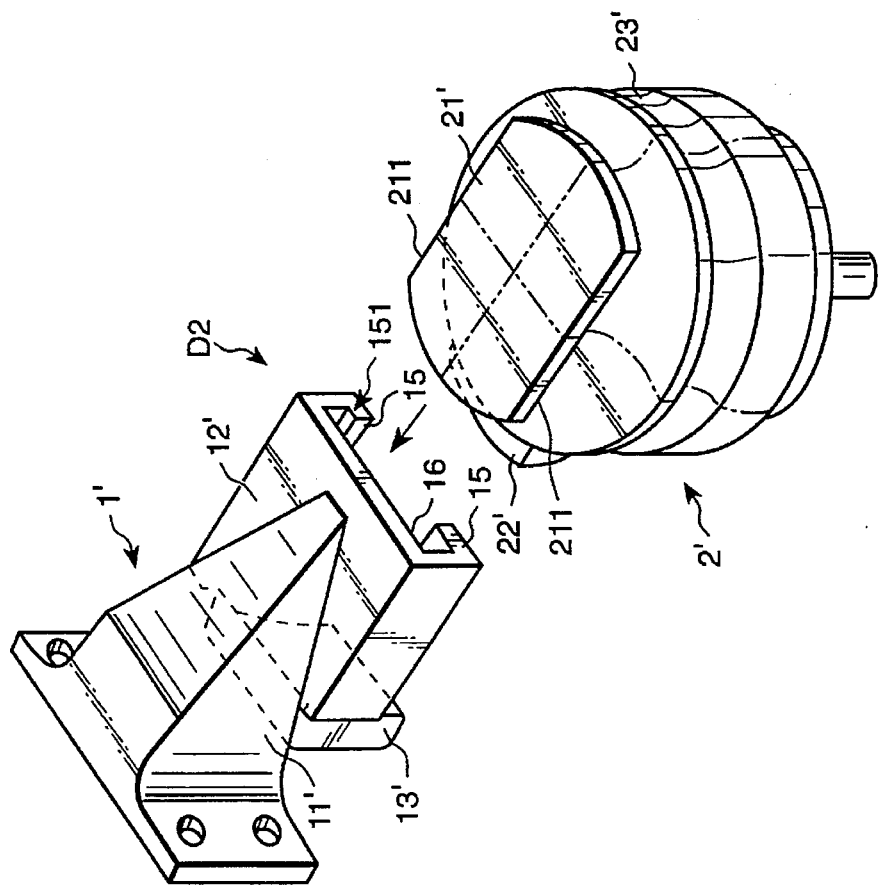

VIBRATION CONTROL DEVICE

The priority applications Nos. 6-68058, filed Mar. 10, 1994 and 6-261527, filed Sep. 30, 1994 in Japan are incorporated herein by reference.

BACKGROUND OF THE INVENTION

1. Field of the Invention

The present invention relates to a vibration control device used between fixed and vibrating members and more particularly to an improved control member and a bracket integrally formed with a mounting stabilizer portion for damping vibration and to ease assembly.

2. Description of Related Art

A conventional vibration control device, which is mounted between a vibrator, such as engine, and a chassis or body of a vehicle, is shown in FIG. 1. A similar vibration control device is disclosed in U.S. Pat. No. 5,018,699.

As shown in FIG. 1, a vibration control device 70 has a vibration control body 20, a mounting bracket 10, which connects the body 20 to a vibrator side member, such as engine, and a stabilizer 30 which serves to damp large vibration movements of control body 20.

The vibration control body 20 comprises an insulator 230, made of anti-vibration rubber material, an upper plate 250 fixed on the top of the insulator 230 and a relatively large size bolt 50 fixed to the upper plate 250. A stopper portion 220 is integrally formed with the insulator 230. The upper plate 250, bolt 50 and nut 40 are used to join the control body 20 to bracket 10.

Bracket 10 comprises a stay portion 110 and provides an interconnection to the engine, and a flange portion 150 which is joined with the upper plate 250 and a separate stabilizer 30.

When bracket 10 is joined to the vibration control body 20, through the flange portion 150 and the upper plate 250, the separate independent stabilizer 30 will co-operate with the stopper portion 220 to damp large movements of body 20.

Because of the bolted joint between the bracket 10 and the body 20 of the conventional vibration control device 70 and the presence of the independent stabilizer 30 mounted between flange 150 and the upper plate 250, assembly becomes complex.

However, some attempts have been made to resolve the above assembling problems, for example, in Japanese Patent Laid-open publication No. Hei 5-44770.

This reference discloses that an elastic body, such as rubber, has either a concave portion or convex portion and the connecting portion of a bracket or a vibrator has an opposite shape for mating purposes so that the mating members are connected to each other without adhesive. Therefore, when the bracket is connected to the elastic body, the assembling work of the vibration control device is finished.

However, stress in the vibration control device in this reference may be concentrated at the connecting portion so that the rubber portion may fatigue or otherwise fail.

Also, if the vibration control device is a hydraulic type, the liquid may leak out.

Further, it is also possible to reduce the connecting force between the mating portions by abrading the surface of the rubber body.

According to the conventional vibration control device shown in FIG. 1, when the vibration control body 20 moves or vibrates over a wide range of magnitudes, that movement is stopped by the cooperation of stabilizer 30 and the stopper portion 220. However, since stabilizer 30 is an independent member and connected with bracket 10 along with the upper plate 250 by bolt 50 and nut 40, there was a need to reinforce the joint portion. Therefore, the thickness of the flange portion 150 might have to be increased which adds to the cost of the unit.

Consequently, there remain problems such as increased weight, increased volume, the need for additional space, an increase in the number of parts and greater assembly time.

SUMMARY OF THE INVENTION

The present invention overcomes the problems described above.

An object of the present invention is to provide a vibration control device that is easy to assemble.

Another object of the present invention is to provide a vibration control device that comprises of relatively fewer parts.

Yet another object of the present invention is to provide a vibration control device which has a sufficiently strong coupling portion, as well as a bracket that is integrally formed with the stabilizer portion.

In accordance with the present invention, these objects are achieved by a vibration control device provided with a vibration control body and a unique bracket for mounting the control body. The bracket includes an integrally formed stabilizer portion, which damps vibrations of a relatively large size.

Further, the present invention provides for an easily formed yet secure coupling between the bracket and the vibration control body.

Other objects, features, and characteristics of the present invention, as well as the methods and operation and functions of the related elements of the structure, will become apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 5 is a perspective view showing the coupling between the bracket and the vibration control body of the second embodiment;

FIG. 6 is a partial cross-sectional and side view of a vibration control device of a third embodiment of the present invention.

DETAILED DESCRIPTION OF THE PRESENTLY PREFERRED EXEMPLARY EMBODIMENTS

Preferred exemplary embodiments of the present invention will now be described with reference to the accompanying drawings.

First Embodiment

Figure 2:
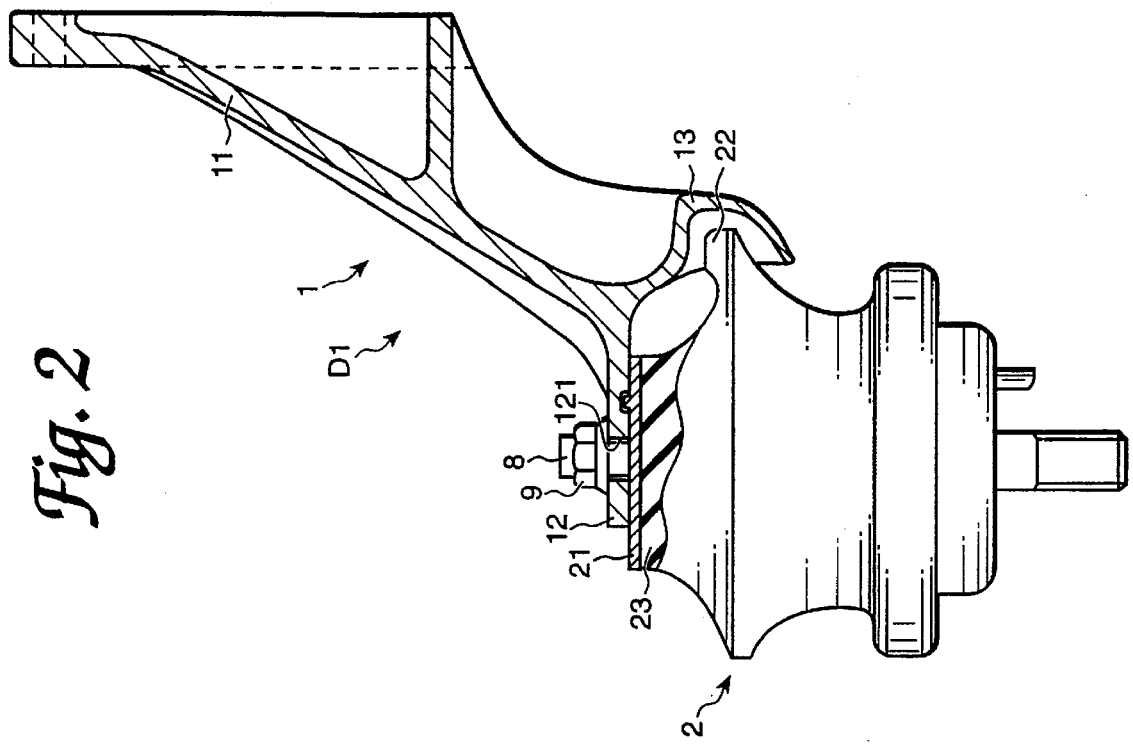
FIG. 2 is a partial cross-sectional and front view of a vibration control device of a first embodiment of the present invention.
Figure 1:
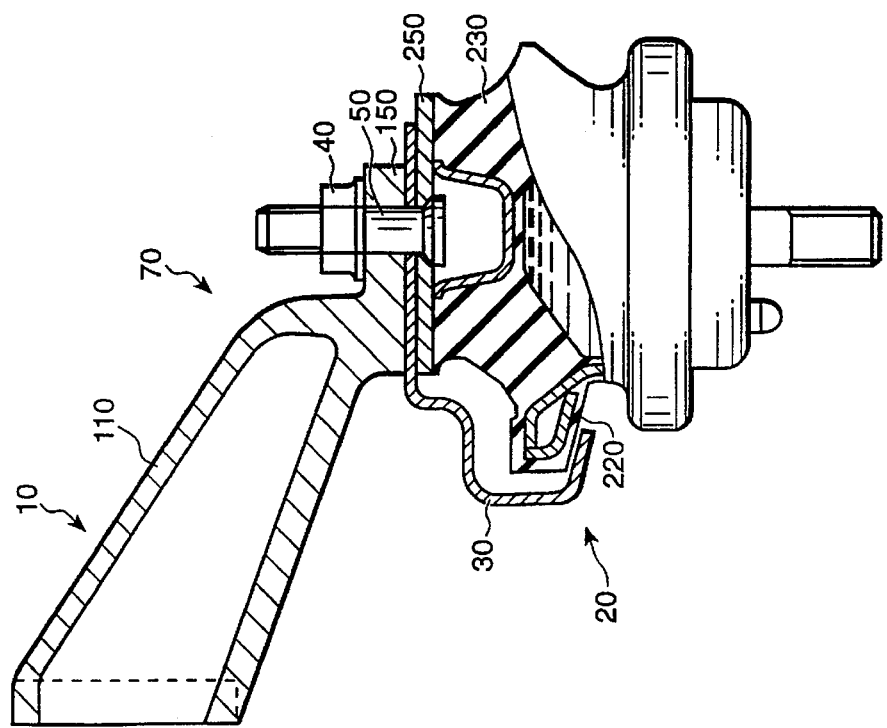
FIG. 1 is a partial cross-sectional and front view of a conventional vibration control device.

As shown in FIG. 2, a vibration control device, generally indicated at D1, has a vibration control body 2 which absorbs and isolates vibrations from a vibrating body, such as engine, and a bracket 1 for connecting the vibration control body 2 to the engine.

The bracket 1 has a stay portion 11 which functions as the connection to the engine (not shown), a flange portion 12, formed at the one end portion of the stay portion 11, and a stabilizer portion 13 which damps large or more violent movements of the vibration control body 2. The stay, stabilizer and flange portions of bracket 1 are integrally formed as one member and from the same material. Further, an under or bottom surface of the flange portion 12 is in contact with an upper or top surface of an upper plate 21 of the body 2, as the coupling portion, and the flange portion 12 includes a hole 121 through which a connecting bolt 8, of the vibration control body 2, is inserted and retained by a nut 9.

The vibration control body 2 includes upper plate 21, which contacts flange portion 12 in face to face contact, an insulator 23 made of anti-vibration rubber material or a similar material, and a stopper portion 22 integrally formed with the insulator 23. Therefore, the upper plate 21 is a coupling element. The stopper portion 22 extends outwardly from the outer wall of the insulator 23. Further, the insulator 23 is fixed under the upper plate 21 by adhesion, for example, established by vulcanization. Also, the connecting bolt 8 is fixed to the upper plate 21.

Bracket 1 is coupled to the vibration control body 2 through flange portion 12 and upper plate 21, by the bolt 8 and nut 9. By simply screwing nut 9 onto bolt 8 assembly of the vibration control device D1 is finished.

The vibration control device D1 is mounted between the engine and the body or frame of the vehicle. Vibration is transmitted from the engine through the stay portion 11, flange portion 12 and stabilizer portion 13 to the vibration control device 2.

Almost all vibration transmitted from the engine is absorbed and isolated at the insulator 23. When large dynamic movements occur such transmitted vibration is absorbed and isolated between the stabilizer portion 13 of the bracket 1 and the stopper portion 22 of the body 2 which then contact each other.

At that time, since bracket 1 is integrally formed with stay portion 11, flange portion 12 and stabilizer portion 13, the transmitted vibration disperses to the whole bracket 1. This integral structure also provides a large coupling contact area between bracket 1 and body 2 by the face to face contact, so that vibration is smoothly transmitted without concentrating stress on bracket 1.

Therefore, there is no need to greatly reinforce and rigidify bracket 1. Consequently, it is possible to use a lighter weight and thinner shaped bracket 1.

Further, as the coupling between bracket 1 and body 2 has a large contact area, due to the face to face contact therebetween, and because the bracket 1 is sufficiently rigid with the stay portion 11 and stabilizer portion 13 being integrally formed, there is no need to make the upper plate 21 highly rigid. Therefore, the upper plate 21 can be a thin plate. Further, it is possible to use a smaller size connecting bolt 8 and nut 9.

Consequently, it is possible to make a light weight vibration control device D1.

Second Embodiment

Figure 3:
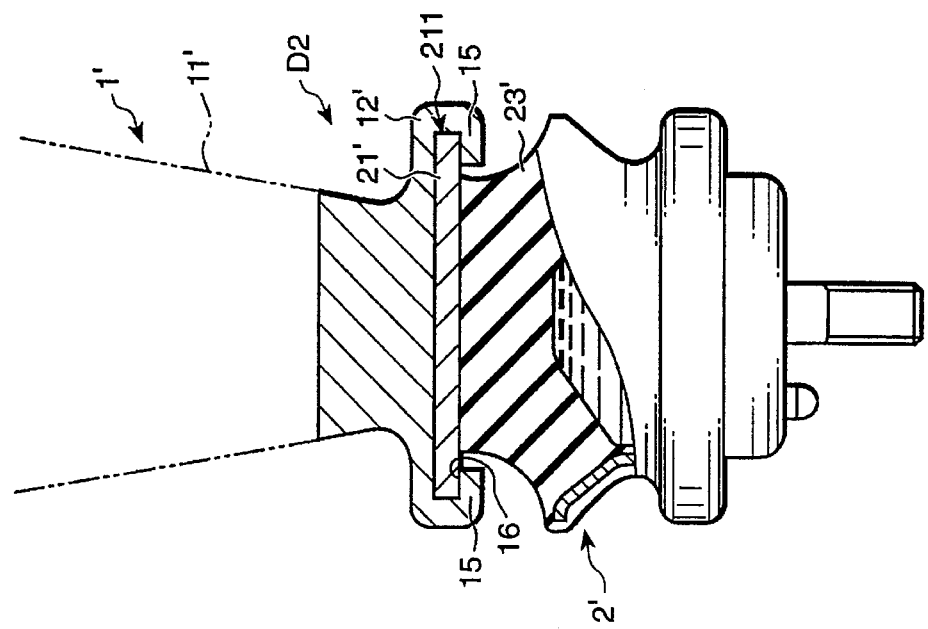
FIG. 3 is a partial cross-sectional and front view of a vibration control device of a second embodiment of the present invention.
Figure 4:
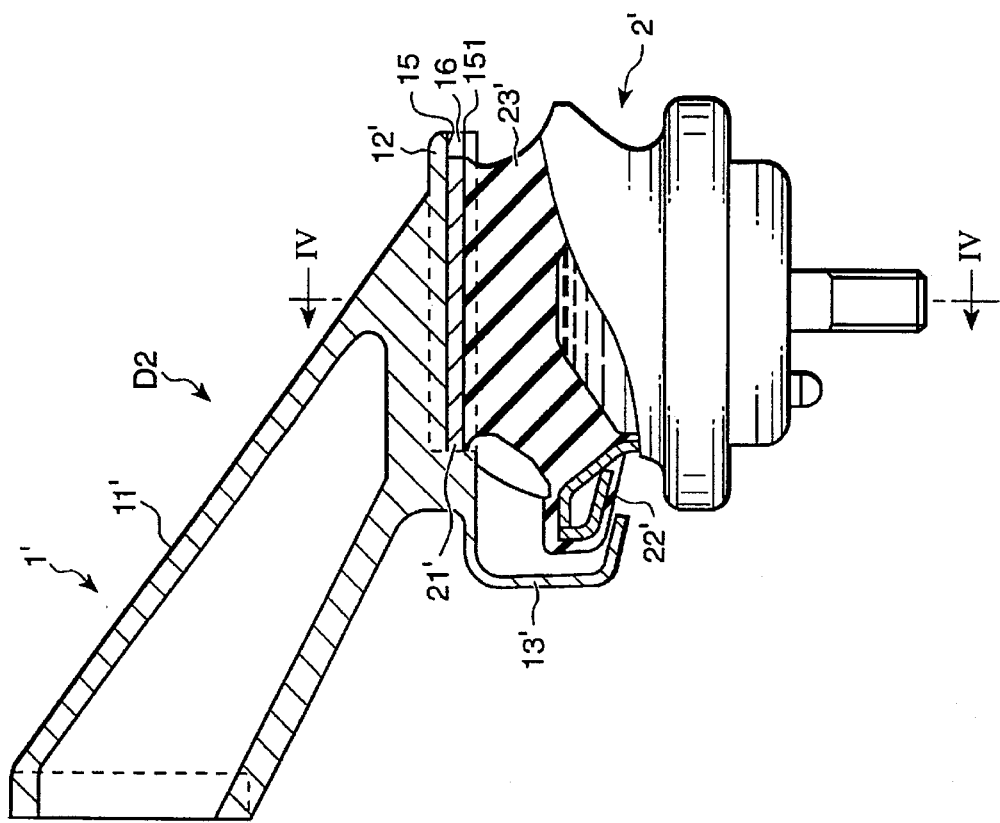
FIG. 4 is a partial cross-sectional and side view of the vibration control device in FIG. 3, looking in the direction of arrow IV in FIG. 3.

In FIGS. 3 to 5, a vibration control device D2 of a second embodiment is shown which is basically the same as the vibration control device D1 in the first embodiment. However, the coupling between bracket 1' and a vibration. control body 2' is different.

The vibration control device D2 has a bracket 1' and a vibration control body 2'. Bracket 1' has a stay portion 11', which functions as an interconnection to the engine, a flange portion 12' formed at the one end portion of the stay portion 11', and a stabilizer portion 13' which dampens large dynamic movements of the body 2'. Portions 11', 12', 13' are integrally formed as one member. Further, the flange portion 12' has a pair of U-shaped edge portions 15, as shown in FIG. 4, for slidably receiving an upper plate 21' of the body 2'. The U-shaped edge portions 15 and the under surface of the flange portion 12' define a slot 16. Therefore, the flange portion 12' is one of the coupling elements.

The vibration control body 2' has an upper plate 21' which is sized to be inserted into slot 16, an insulator 23' made of anti-vibration rubber material or similar such materials, and a stopper portion 22' integrally formed with the insulator 23'.

The upper plate 21' comes into contact with the inner surfaces of the flange portion 12' and when in its desired mounted position is in face to face contact within the confines of slot 16. Therefore, the upper plate 21' is a coupling element. The insulator 23' is fixed to the bottom surface of the upper plate 21' by adhesion, such as by a vulcanization process. Also, when the bracket 1' and body 2' are coupled to each other, the stopper portion 22' is located in a recess of the stabilizer portion 13' shown in FIG. 3. The stopper portion 22' cooperates with the interior of stabilizer portion 13' to damp large dynamic movements of the body 2' when such vibration is transmitted from the engine.

The upper plate 21' has a pair of parallel side edges 211, with the front and rear edges being curved so that plate 21' is shaped somewhat like an oval as shown in FIG. 5. Then, these parallel side edges 211 mate with the U-shaped edge portions 15 of the slot 16. This engagement makes a connecting portion comprised of plate 21' and flange portion 12'. This engagement is carried out, for example, by pressurized insertion or clamping the U-shaped edge portions 15 against plate 21'. When pressurized insertion is the technique used, that is by forcing plate 21' into slot 16 and then conforming flange portion 12' to plate 21' under pressure, so that at least one front end portion 151 of the U-shaped edge portions 15 can be clamped or closed down relative to plate 21', for example, by a punch clamp.

According to this second embodiment, the bracket 1' and body 2' are first coupled together. At that time, the parallel side edges 211 of the upper plate 21' will have been inserted into and engaged by the U-shaped edge portions 15. Then, punch clamping is carried out, preferably on both front end portions 151 Of the U-shaped edge portions 15. This strongly couples bracket 1' and body 2' together through the coupling members in the form of flange portion 12' and upper plate 21'.

Consequently, the assembly of bracket 1' and body 2' is easy and efficient. Since the stabilizer portion 13' is integrally formed with bracket 1', there is no need to independently assemble the stabilizer portion as with conventional vibration control devices. Further, there is no need to use bolts and nuts. Therefore, assembly of the vibration control device D2 requires fewer parts than earlier structures.

Also, the same function and result are obtained from the second embodiment as with the first embodiment.

Third Embodiment

In FIG. 6, a third embodiment of a vibration control device D3 is shown and again is basically the same as the two earlier embodiments. However, the coupling between bracket 1" and the vibration control body 2" has been modified.

Namely, the bracket 1" also has a flange portion 12" formed with a lower portion including outwardly flared side edges 34 which serve as part of a coupling portion of flange portion 12". Therefore, the flange portion 12" is again one of the coupling elements.

The upper plate 21" of the body 2" has upwardly and inwardly bent edges 28 at two opposing sides. Edges 28 and the upper interior surface of plate 21" define the groove generally shown at 29. The outwardly flared side edges 34 are inserted into groove 29 whereby the upper surface of plate 21" contacts the bottom surface of flange portion 12" establishing face to face contact therebetween. Therefore, the upper plate 21" is the other and opposing coupling element relative to the lower part of flange portion 12". The remaining structure of the vibration control device D3 of the third embodiment is the same as the device D2 in the second embodiment, including the damping structure to damp large dynamic movements.

Here again, the coupling between bracket 1" and body 2", that is the insertion of edges 34 into groove 29, can be accomplished by pressurized insertion. Bent edges 28 of the upper plate 21" can then be clamped in place to complete attaching the bracket 1" with the body 2". Also, at least one front end portion of the bent edges 28 that extend beyond flange portion 12" can be clamped, for example, by punch clamping. Therefore, bracket 1" and body 2" can be strongly coupled together.

Consequently, the same function and result are obtained in the third embodiment as in the second embodiment.

Fourth Embodiment

Figure 7:
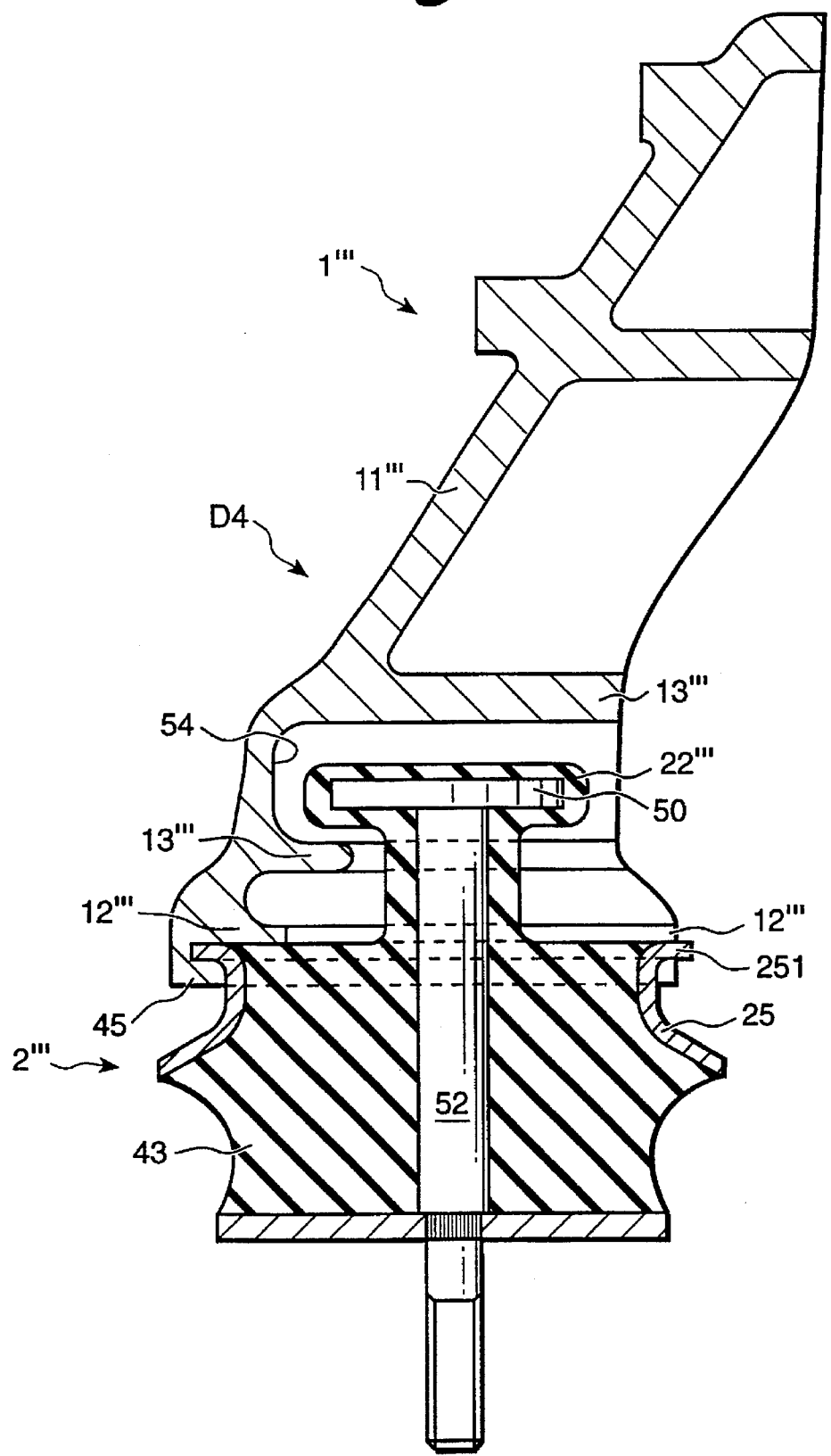
FIG. 7 is a partial cross-sectional view of a vibration control device of a fourth embodiment of the present invention.

FIG. 7 shows a fourth embodiment of a vibration control device D4. This modified device is also basically similar to the vibration control devices D1, D2, D3. However, it should be noted that a different damping arrangement is used and formed from stopper portion 22'" of the vibration control body 2'" and the stabilizer portion 13'" of bracket 1'" positioned above or over insulator 43 of the body 2'".

The vibration control device D4 includes a bracket 1'" and a vibration control body 2'". Bracket 1'" has a stay portion 11'" for connection to an engine, a flange portion 12'" formed at one end of the stay portion 1'", and a stabilizer portion 13'" which dampens large magnitude vibrations or movements of the body 2'". The stabilizer portion 13'" is located at a point intermediate along the length of the bracket 1'", and over the insulator 43 of the body 2'". All portions of bracket 1'" are integrally formed as one member and of the same material. Further, flange portion 12'" has a pair of U-shaped edge portions 45 for receiving a flange 251 of an outer cover 25 located about the body 2'". Therefore, the flange portion 12'" is again one of the coupling elements.

The vibration control body 2'" has a resilient insulator portion 43 made of anti-vibration rubber or similar material, the outer cover 25, and a stopper portion 22'". The stopper portion 22'" is formed to have a T-shaped cross-section, preferably covered by the rubber material, with a horizontally extending member 50 of T-shape fixed to a vertical part 52. Member 50 is located above insulator 43 and when body 2'" is mounted to bracket 1'", member 50 is located or positioned in a manner such that its movements will be opposed by stabilizer portion 13'". The outer cover 25, as noted above, is provided with an outwardly radially extending flange 251. Preferably the stopper portion 22'" is axially aligned with insulator 43 and the stabilizer portion 13'". The flange 251 is formed in an oval like shape which includes a pair of parallel side edges that will be inserted into a groove defined by the U-shaped edge portions 45. Therefore, the flange 251 is the other coupling element.

When bracket 1'" and body 2'" are coupled together, the stopper portion 22'" is located in a recess 54 provided within the stabilizer portion 13'". Stopper portion 22'" cooperates with the stabilizer portion 13'" to damp large magnitude movements of an engine and, accordingly, of the body 2'" when such vibrations are transmitted from the engine. The coupling of cover 25 and its flange 251 to bracket 1'" can be carried out, for example, by pressurized insertion of the cover 25 into the grooves defined by edge portions 45, including the clamping of the U-shaped edge portions 45, relative to flange 251, such as in the second or third embodiments. If pressurized insertion is employed, at least one front end portion of the U-shaped edge portions 45 can be closed or clamped together by punch clamping.

The remaining structure of the vibration control device D4 of the fourth embodiment is the same as the devices D2, D3 in the second and third embodiments.

According to this fourth embodiment, where the bracket 1'" and the body 2'" are coupled by pressurized insertion, the parallel side edges of the flange 251 are inserted into and thus engaged by the U-shaped edge portions 45. Then, punch clamping is carried out on each front end portion of the U-shaped edge portion 45 to lock flange 251 in place.

Therefore, bracket 1'" and body 2'" can be strongly coupled together. The assembled vibration control device D4 is compact, especially in a width direction, and assembly is easily and efficiently accomplished.

Further, the same function and result are obtained in the fourth embodiment as in the second and third embodiments.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vibration control device comprising:

a bracket; and a vibration control body coupled to said bracket;

said bracket having a stay portion, a flange portion formed at one end of said stay portion and having a pair of parallel side edge portions, and a stabilizer portion, said stay, flange and stabilizer portions being integrally formed together as one member, said vibration control body having an insulator comprised of anti-vibration material, a coupling member fixed to said insulator and having a pair of parallel side edges, said coupling member mating with said flange portion such that said side edges of the coupling member are slidably received by said side edge portions of said flange portions; to thereby securely fix said vibration control body to said bracket, and a stopper portion for cooperating with said stabilizer portion to damp vibration.

2. A vibration control device as set forth in claim 1, wherein said side edge portions of the flange portion are U-shaped.

3. A vibration control device as set forth in claim 2, wherein said coupling member comprises a plate having said pair of parallel side edges that mate with said pair of U-shaped edge portions.

4. A vibration control device as set forth in claim 3, wherein at least one of said pair of U-shaped edge portions includes a portion that is crimped together to retain said plate.

5. A vibration control device as set forth in claim 2, wherein said coupling member comprises an annular shaped member extending about at least a portion of said vibration control body, said annular member including said pair of parallel side edges which extend outwardly therefrom.

6. A vibration control device as set forth in claim 5, wherein at least one of said pair of U-shaped edge portions includes a portion that is crimped together to retain said annular member.

7. A vibration control device as set forth in claim 1, wherein said coupling member is conformed about a lower portion of said flange portion through upwardly extending edge members on said coupling member.

8. A vibration control device as set forth in claim 7, wherein said upwardly extending edges are clamped to said flange portion.

9. A vibration control device as set forth in claim 1, wherein said stopper portion, said stabilizer portion and said insulator are axially aligned.

10. A vibration control device as set forth in claim 1, wherein said stabilizer portion includes means defining an opening adjacent said flange portion and said stopper portion is located in an opposed manner within said opening of said stabilizer portion.

\* \* \* \* \*